United States Patent [19]
Brantley, Jr. et al.

[11] Patent Number: 5,125,096
[45] Date of Patent: Jun. 23, 1992

[54] SYSTEM FOR IMPLEMENTING TO A PACKET SWITCH PROTOCOL FOR A MULTINODE DATA COMMUNICATIONS NETWORK UTILIZING SEPARATE DATA AND CONTROL PATHS

[75] Inventors: William C. Brantley, Jr., Mount Kisco; Wayne S. Groh, Tarrytown; Rory D. Jackson, Eastchester; Vern A. Norton, Croton-on-Hudson, all of N.Y.

[73] Assignee: International Business Machines Corporation, Armonk, N.Y.

[21] Appl. No.: 264,419

[22] Filed: Oct. 31, 1988

[51] Int. Cl.$^5$ .............................................. G06F 13/00
[52] U.S. Cl. ...................... 395/800; 364/229; 364/229.3; 364/239; 364/240.8; 364/DIG. 1
[58] Field of Search ................ 370/60; 340/825.5; 364/200 MS File, 900 MS File

[56] References Cited

U.S. PATENT DOCUMENTS

| | | | |
|---|---|---|---|
| 4,212,080 | 7/1980 | Milliken | 364/900 |
| 4,253,144 | 12/1978 | Bellamy et al. | 364/200 |
| 4,276,656 | 6/1981 | Petryk | 455/608 |
| 4,412,285 | 10/1983 | Neches et al. | 364/200 |
| 4,451,901 | 5/1984 | Wolfe et al. | 364/900 |
| 4,494,230 | 1/1985 | Turner | 370/60 |
| 4,663,706 | 5/1987 | Allen et al. | 364/200 |
| 4,710,922 | 12/1987 | Scott | 370/112 |
| 4,797,882 | 1/1989 | Maxemchuk | 370/94 |
| 4,809,217 | 2/1989 | Floro et al. | 364/900 |
| 4,862,451 | 8/1989 | Closs et al. | 370/60 |
| 4,866,702 | 9/1989 | Shimuzu et al. | 370/60 |
| 4,890,281 | 12/1989 | Balboni et al. | 370/60 |

OTHER PUBLICATIONS

*Data Networks,* D. Bertsckas and R. Gallager, 1987, pp. 423–439.
*Computer Networks,* 1981, Tanenbaum, pp. 153–157.

*Primary Examiner*—Thomas C. Lee
*Assistant Examiner*—William M. Treat
*Attorney, Agent, or Firm*—Ratner & Prestia

[57] ABSTRACT

Packet switch protocol and circuitry for implementing it are disclosed. According to this protocol, a message transmitter of a first node in the network may send data through a data transmission link at a predetermined rate until it is signalled, via a control signal generated by a message receiver in a second node, to suspend its transmissions. The message transmitter may also be signalled to resume transmitting data. The message receiver includes a buffer memory in which messages are temporarily stored if their selected path is blocked as they pass through the network. When the amount of available space in the buffer is less than a preprogrammed threshold value, the message receiver generates the control signal to suspend message transmission. This threshold value leaves sufficient space in the buffer to store any data which may be in the pipeline between the transmitter and the receiver. When the amount of available space rises above this threshold, the message receiver indicates to the transmitter to resume transmission. A message spanning an interface during transmission may be suspended without losing spatial contiguousness. The message transmitter also transmits a signal which marks the last portion of a message. This signal is stored in the buffer with the message data and is used to delimit messages in the buffer, allowing multiple messages to be stored in one buffer without extra delimiting values.

11 Claims, 10 Drawing Sheets

FIG.1 PARALLEL PROCESSING SYSTEM

SYSTEM FOR IMPLEMENTING TO A PACKET SWITCH PROTOCOL FOR A MULTINODE DATA COMMUNICATIONS NETWORK UTILIZING SEPARATE DATA AND CONTROL PATHS

BACKGROUND OF THE INVENTION

1. Field of the Invention

The present invention relates generally to a method and apparatus for implementing a packet switch protocol for a data communication switching network. More particularly, the present invention relates to a method and apparatus for implementing a handshaking protocol for which computational speed is independent of signal propogation delays between a sending node and a receiving node. In a switching network which uses this protocol the rate of data transmission between the sending and receiving nodes is not affected by the signal propagation delay between the sender and the receiver.

2. Description of the Prior Art

Many data processing applications exist in which computational speed is a limiting factor in the time needed to complete the application. Using larger and faster single processor systems for these applications provides only a limited benefit since, even though these machines may perform the individual calculations at a higher rate, they still process the instructions and data serially. One approach to meeting the need for computational speed is parallel processing.

For this processing method, an application is divided into parts which are suitably distributed among numerous processors operating concurrently. The success of a parallel processing system depends heavily on the communication among the processors and memory used in the system. In a parallel processing environment, processors communicate with each other, as well as with memory, to fetch instructions and operands, store intermediate results, handle interrupts, pass messages and handle input and output functions.

This communication function is often implemented by one or more switching networks coupling the various procesors and memory subsystems together. For effective performance in a parallel processing environment, it is desirable for these switching networks to provide efficient and effective information transmission among the processors and memory subsystems via the workings of their interface logic and control protocols. A key factor in the design of such communications networks is the signal propagation delay for data being transferred between terminal nodes (i.e. processors or memory subsystems) on the network. The practical issues of complexity and cost should also be considered while attempting to optimize the performance of a network.

In the prior art, U.S. Pat. No. 4,412,285 to P. M. Neches et al. relates to a communication mechanism for use among multiple processors and peripheral devices. This communications system transfers data among the terminal nodes (i.e. processors or peripheral devices) via hierarchically coupled switching nodes according to a fixed priority scheme. In this system, transmission line delays between switching nodes are described as being constant and substantially identical. A change in the transmission delay between nodes results in a change in the rate at which data may be transferred through the network. This renders the operating speed of the network dependent upon the signal propagation delay in the switching network.

U.S. Pat. No. 4,276,656 to E. M. Petryk Jr. relates to a communications network in which data is transformed from multi-bit words to a bit-serial signal, and then converted for transmission over an optical fiber link. The use of a bit-serial signal and conversion needed to use the optical fiber links may increase the cost and the signal propagation delay of the system relative to a switching network which uses a parallel-bit signal and conventional electrical transmission lines.

U.S. Pat. No. 4,494,230 to J. S. Turner relates to a data communications switching system which uses a bidirectional bit-serial data transmission link and, in which, control signaling to the various nodes of the system uses the same serial link that is used to transfer data. This technique may require a delay between messages to change the data routing performed by the switch. A delay of this type is added onto the signal propagation delay through the network.

A section of a textbook by A. S. Tanenbaum; entitled *Computer Networks*, Prentice Hall, 1981, pp. 153-157; relates to a data transmission system which uses a pipelining protocol to mitigate a loss in efficiency of the system resulting from relatively long signal propagation delays. This protocol includes provisions for positive or negative acknowledgement from the receiving node, provisions for assuming an error condition after a prescribed amount of time has elapsed without an acknowledgement, and a sliding window mechanism for buffering data within the sending and receiving units.

SUMMARY OF THE INVENTION

It is an object of the present invention to provide a network communications protocol which allows data transmission rates that are independent of any signal propagation delay between a sending node and a receiving node.

It is a further object of this invention to provide a network communications protocol that allows message lengths to be substantially independent of the size of the buffers in the switching nodes of the network and, of the physical interface protocol mechanism.

It is another object of the invention to provide a network communications protocol which allows portions of a message to advance immediately, along a transmission path having no contention, without needing message accumulation at intermediate switching nodes. This protocol allows a message to advance along a transmission path to a stage where there is contention, even though that stage may not have sufficient buffer space for the entire message. Furthermore, there is no loss of data and no regression in the propagation of the message through the network when contention is encountered.

It is an additional object of the present invention to provide a communications network which minimizes overhead operations by use of a protocol in which individual messages do not require interface utilization for message setup and in which a message gives up control of a link between two nodes immediately following its transmission through the link.

The present invention is embodied in a data transfer protocol for a data communications network. The network includes numerous nodes, which may either send data, receive data or both send and receive data. Each receiving node includes a buffer which may temporarily hold message data provided by a sending node to which it is coupled. According to this protocol, a receiving node signals the sending node to stop sending data before its buffer is completely full, i.e. when the amount of available space in the buffer approaches that which would be filled by data in the pipeline between the sending and receiving nodes. Responsive to this signal, the sending node suspends the transmission of data to the receiving node until it receives a signal indicating that data transmission may resume.

The sending node then sends the remaining data without breaking its connection to the receiving node. According to another aspect of the invention, the sending node provides a signal which indicates when the last item of data is sent. This signal is stored in the buffer with the data and is used to separate data associated with respectively different messages. This protocol allows each node in the network to provide a continuous stream of data without regard to the signal propogation delay between the sending and receiving nodes.

BRIEF DESCRIPTION OF THE DRAWINGS

The foregoing and other objects, aspects and advantages of the invention will be better understood from the following detailed description of the invention with reference to the drawings in which.

DETAILED DESCRIPTION OF THE PREFERRED EMBODIMENT OF THE INVENTION

The system described below relates to an implementation of an interface protocol for a data communications network. The network comprises an array of interconnected data switching nodes each having a message transmission section and a message receiving section. The protocol defines the interface between the message transmission section of one node and the message receiving section of a node to which it may send data. This interface is of particular importance when the signal propagation delay through the data link connecting the two nodes is greater than one clock period. In this case there may be a significant reduction in the transmission efficiency of the network caused by signal propagation delays between the nodes.

The described protocol operates substantially independently of any signal propagation delay between transmitting and receiving nodes. In accordance with this protocol, each message includes information which defines its path through the network. The message progresses through the network in steps, from node to node, each node buffering some or all of the message when the selected path is blocked. If a message is transmitted to a receiving node which has a full buffer, the path between the sending and receiving nodes is held open until buffer space is available in the receiving node. The protocol governing this interface between the sending and receiving nodes ensures that no data is lost due to insufficient buffer space and that messages are minimally delayed in traversing the network.

Figure 1:
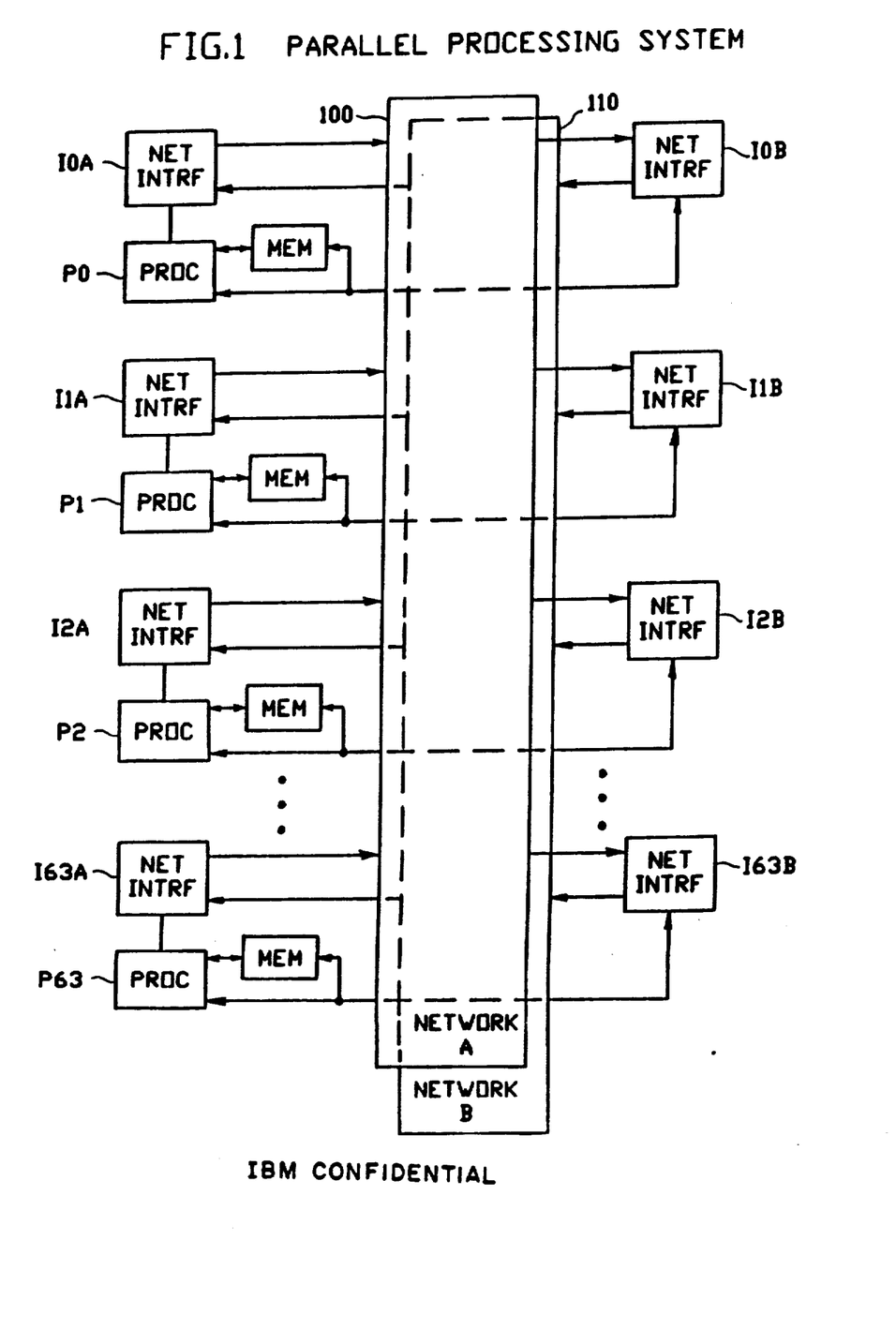
FIG. 1 is a block diagram illustrating the organization of a typical parallel processor system.

FIG. 1 is a block diagram of a parallel processing system which includes 64 processors, (P0 through P63) each of which includes a local memory unit (M0 through M63). In this system, each of the processors P0 through P63 may communicate with any of the other processors P0 through P63 via two separate data communications networks, 100 and 110. The processors P0 through P63 apply data to the network 100 and accept data from the network 110 via respective network interface circuits I0A through I63A. In the same manner, network interface circuits I0B through I63B are used by the respective processors P0 through P63 to apply data to the network 110 and accept data from the network 100. The data communications networks 100 and 110 are identical and are of the delta variety.

Each network by itself couples all 64 of the processors together, allowing any processor to transmit data to and accept data from the memory unit of any other processor on the system. The two networks 100 and 110 are used in this embodiment of the invention, to avoid a deadlock situation which may occur when processors are simultaneously attempting to communicate with each each other's memory. In this deadlock situation, a message from each of the processors blocks the path of a message from the other processor.

In the embodiment of the invention described below, the processors P0 through P63 use one network (e.g. 100) to request data from the memory units of other processors in the system and the memory units M0 through M63 use the other network (110) to respond to data requests from the other processors. In addition, the networks 100 and 110 may be used for direct processor to processor communication via interprocessor interrupts.

Figures 2, 2A:
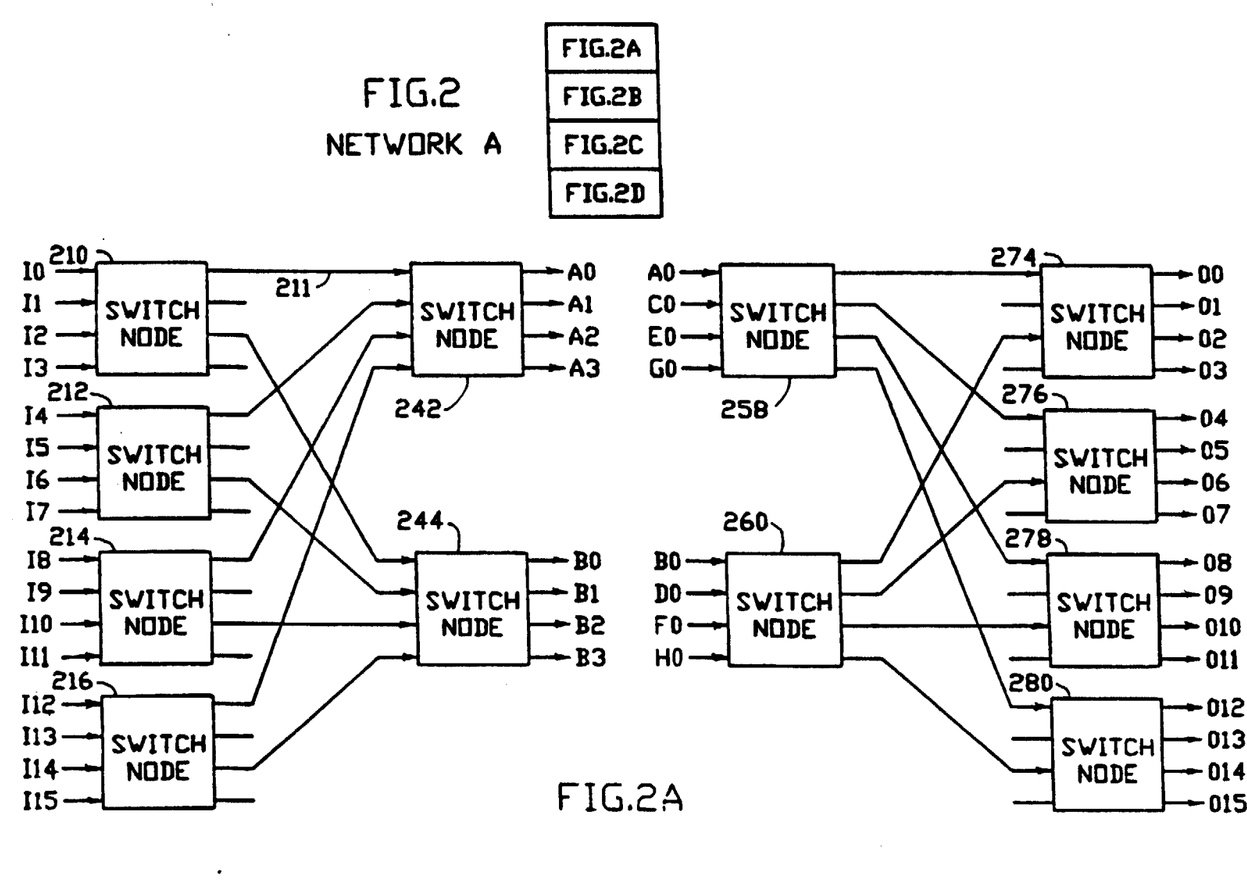
FIG. 2 (comprised of 2A-2D) is a block diagram showing the overall structure of a data communications switching system suitable for use in the parallel processor system shown in FIG. 1.
Figure 2B:
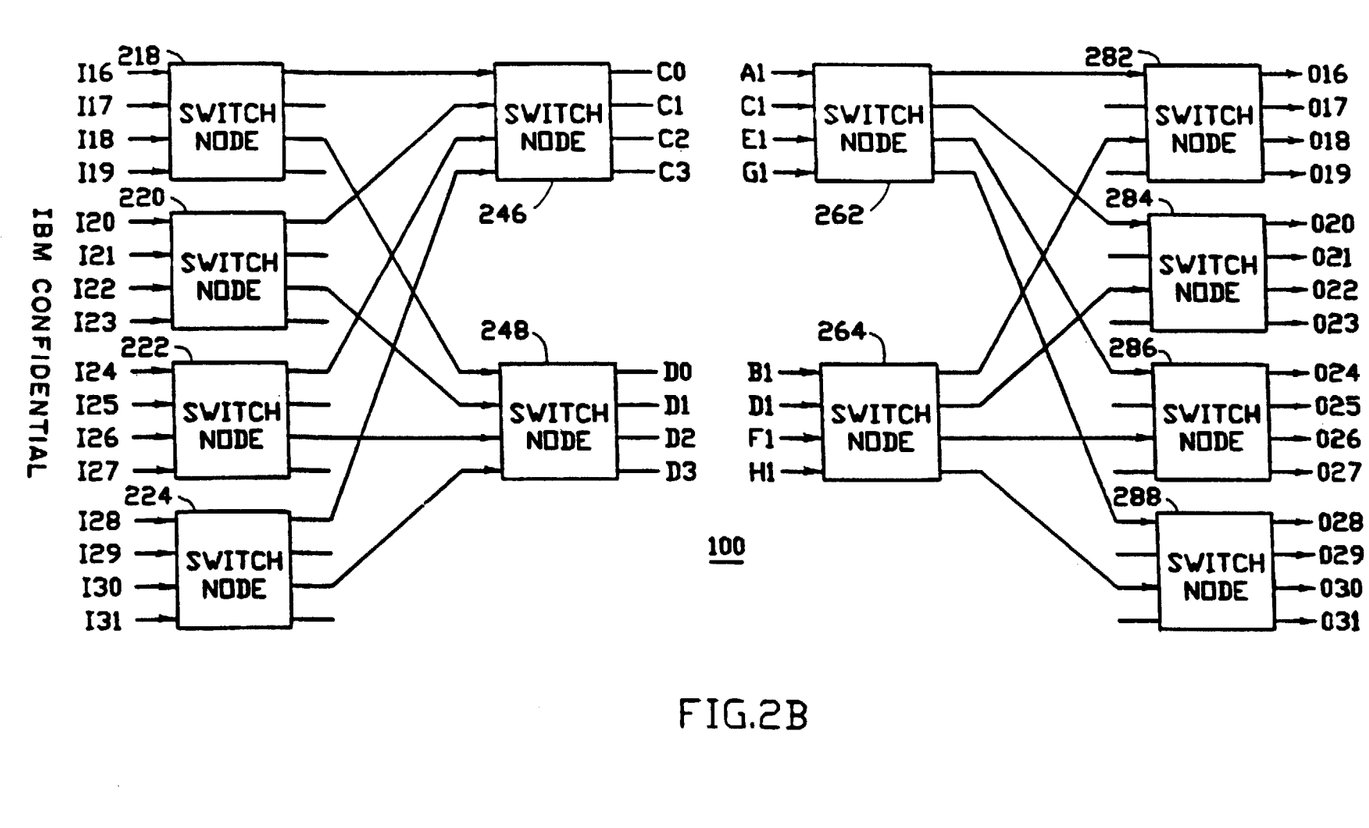
Figure 2C:
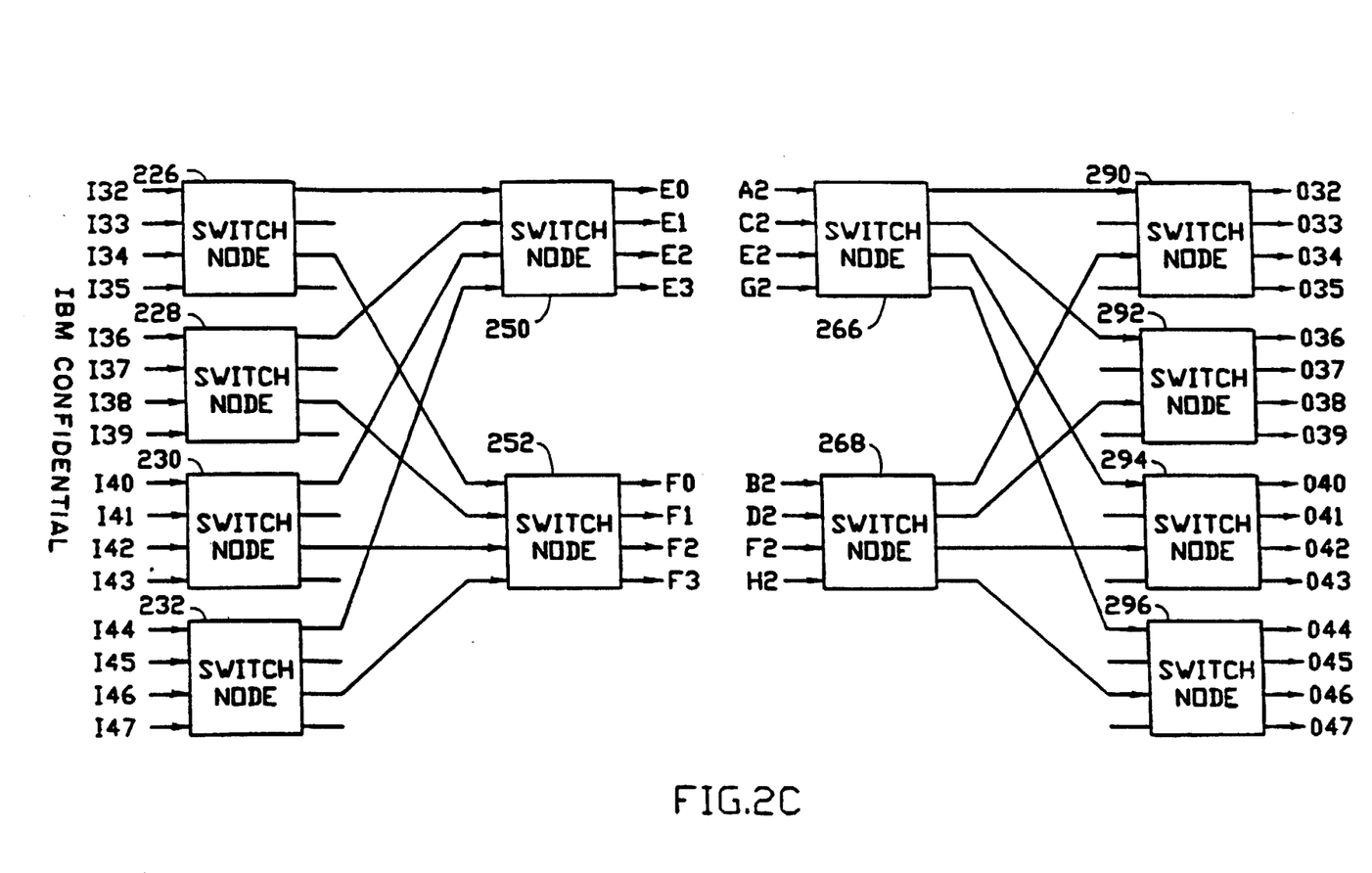
Figure 2D:
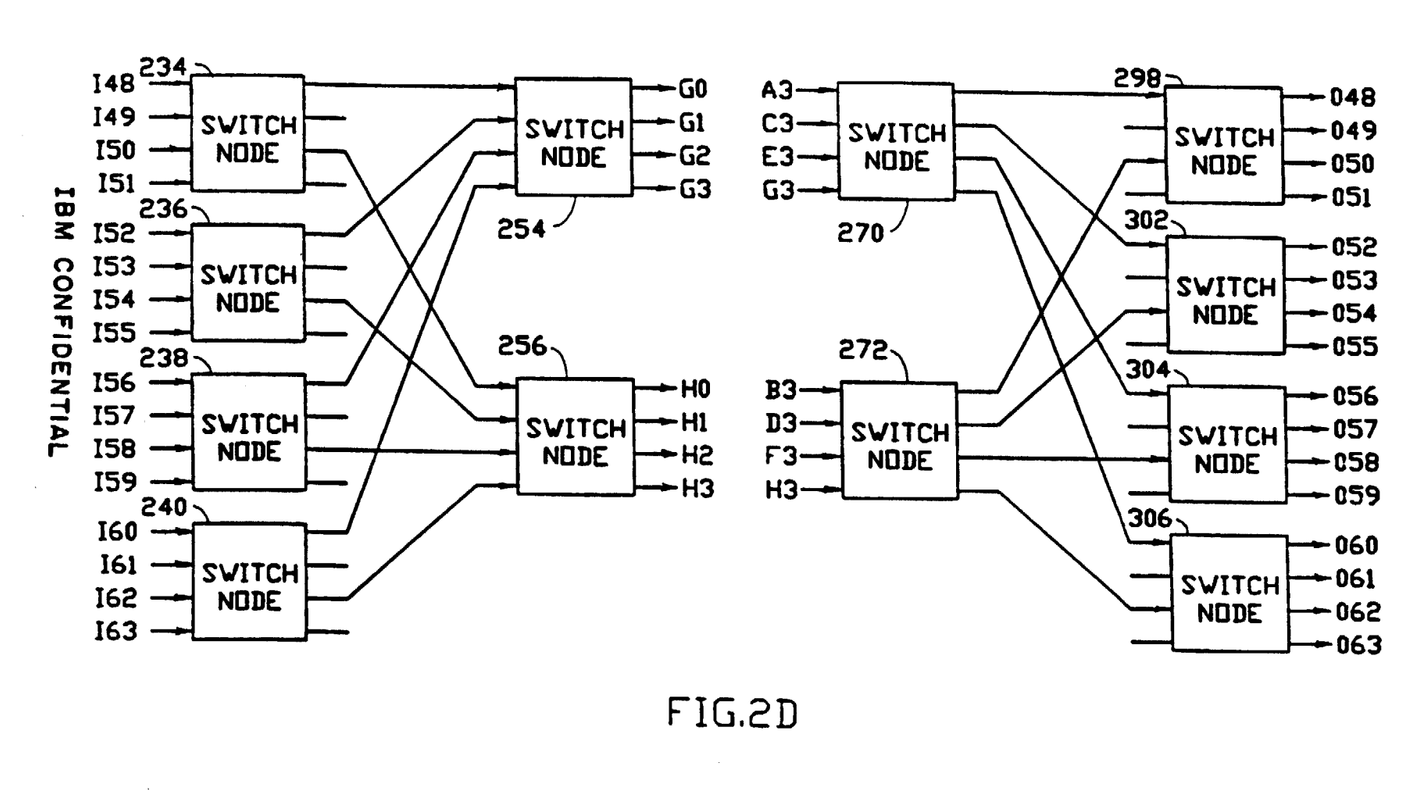

FIG. 2 is a block diagram of circuitry suitable for use as either of the networks 100 or 110. For consistency with FIG. 1, the network shown in FIG. 2 is identified as the data communications network 100. The circuitry shown in FIG. 2 includes 48 four-by-four switch nodes configured in four columns. Each switch node may selectively couple data applied to any one of its four input ports to any one of its four output ports. As set forth below, the switch nodes used in the described parallel processing system, route message data from a particular input port to a particular output port based on routing information included in a message header.

The network 100 shown in FIG. 2 is configured as follows. Each node in the first (leftmost) column is coupled to receive data from four processors and to transfer this data to two switch nodes in the second column. For example, switch node 210 is coupled to receive data from processors P0, P1, P2 and P3 and to provide this data to switch nodes 242 and 244. Each node in the second column is configured to accept data from four switch nodes in the first column and to apply this data to four switch nodes in the third column. For example, the node 242 is coupled to receive data from nodes 210, 212, 214 and 216 and to provide data to nodes 258, 262, 266, and 270. The switch nodes in the third column are coupled to receive data from four switch nodes in the second column and to provide this data to four switch nodes in the fourth column. For example the node 258 accepts data from nodes 242, 246, 250, and 254 and provides data to nodes 274, 276, 278 and 280. Finally, the nodes in the fourth column are each configured to accept data from two nodes in the third column and to provide data to four of the processors P0 through P64. For example, node 274 is coupled to receive data from the nodes 258 and 260 and to provide this data to the processors P0, P1, P2 and P3. The arrangement of switch nodes shown in FIG. 2 allows any of the processors P0 through P63 to simultaneously transmit data to, and receive data from any of the other processors without encountering a deadlock condition.

Figures 3, 3A:
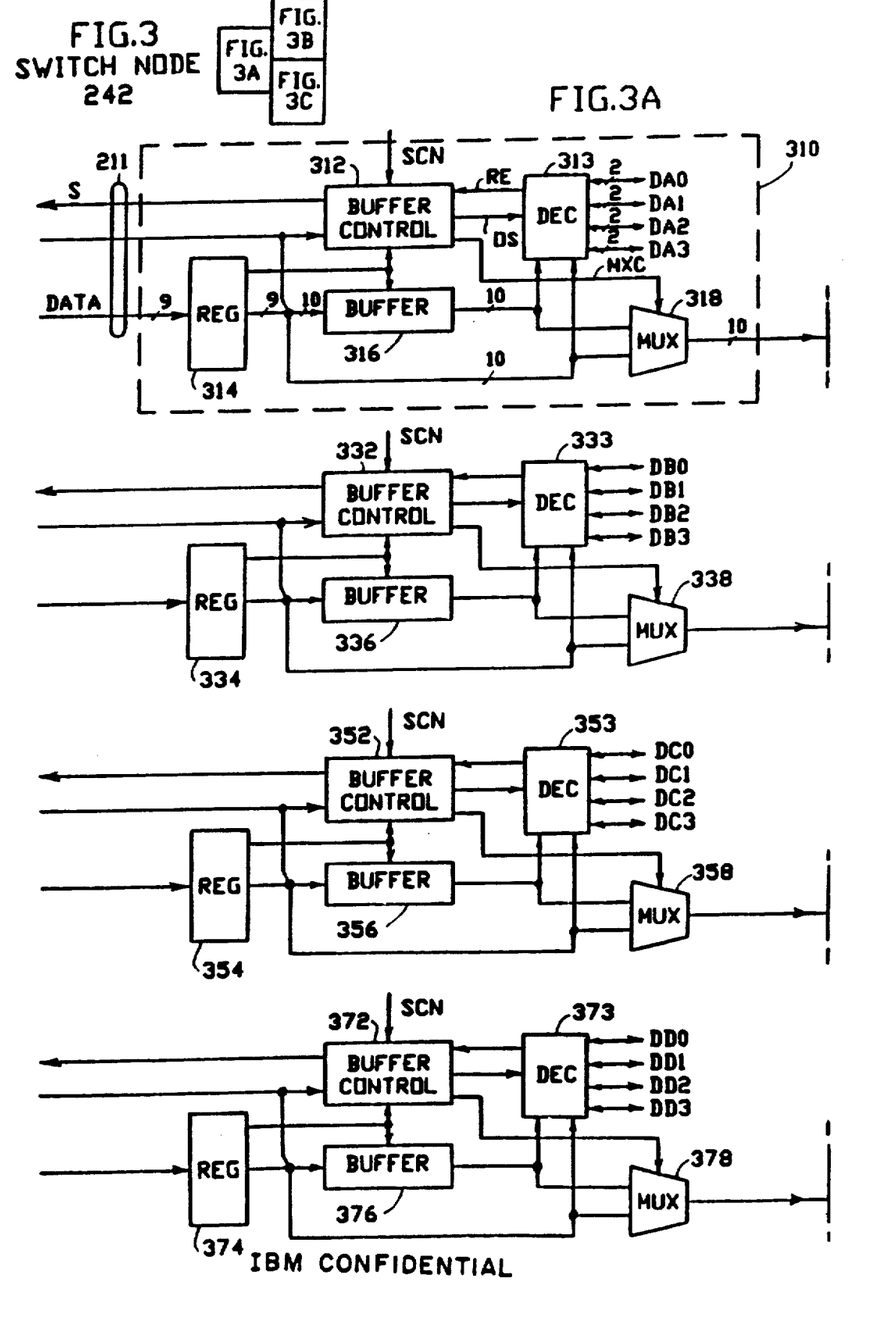
FIG. 3 (comprised of 3A-3C) is a block diagram which is useful for explaining the structure of one of the switching nodes used in the data communications switching system shown in FIG. 2.
Figure 3B:
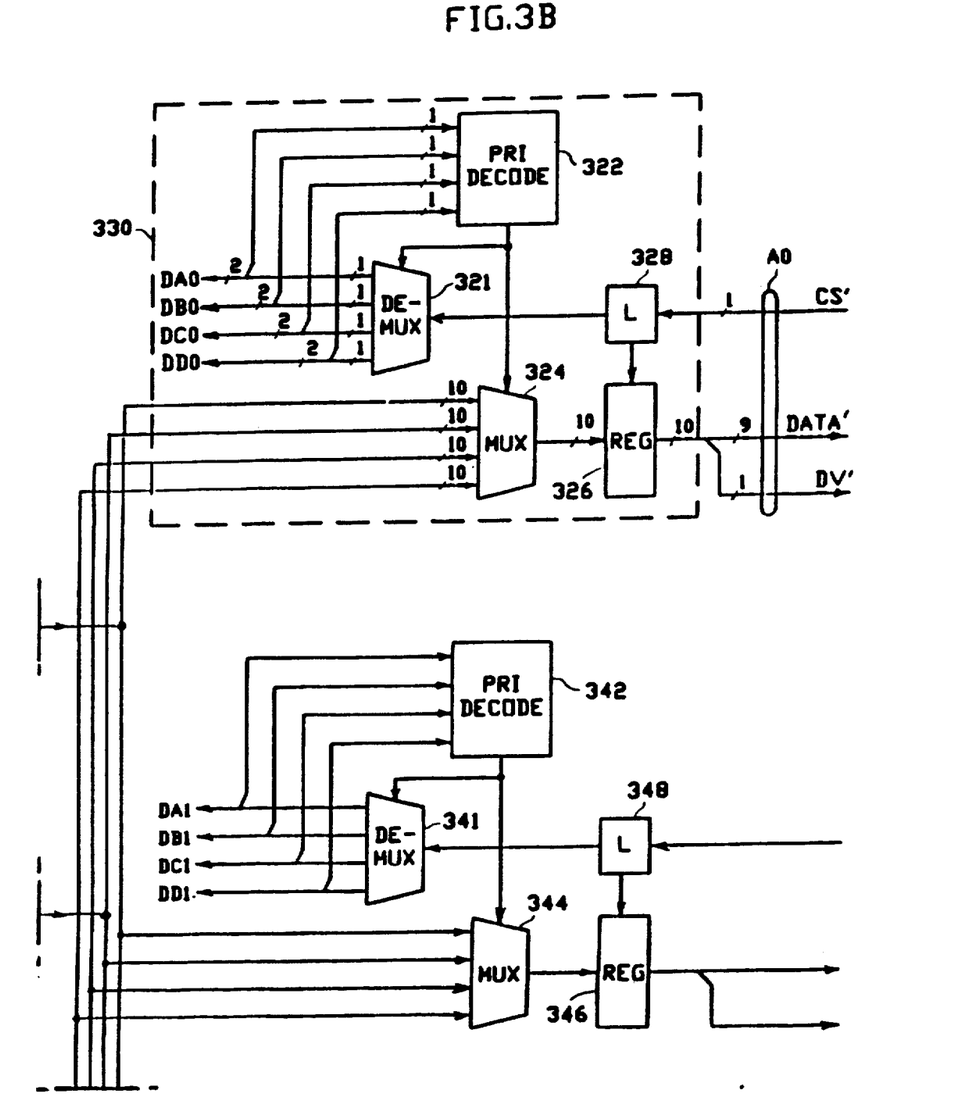
Figure 3C:
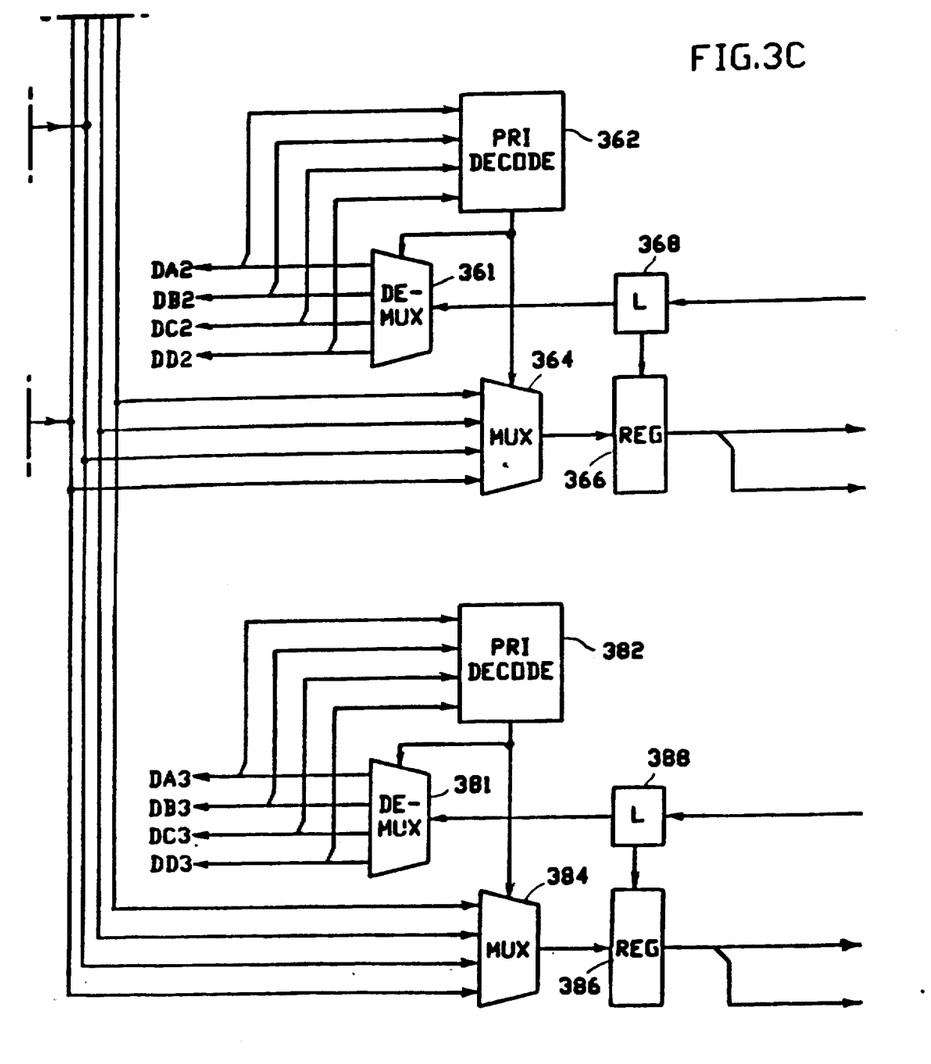

The path that a message takes through the network is determined by its source processor. This path is encoded in a sequence of values in the message header. In the present embodiment of the invention, this code includes a two-bit value for each level of switch nodes in the network. In FIG. 3 the four levels of the network are represented by the four columns of switch nodes, respectively. The first routing value in a message header directs the message to one of the two active output ports of the switch node to which the source processor is coupled. The second value routes the message to one of the four output ports of a node in the second column which was selected by the first value. In the same manner, the third and fourth values select paths through nodes in the respective third and fourth columns of the network. The selected output port of the selected switch node in the fourth column of the network is coupled to the destination processor for the message.

In general, message transmission through the network occurs as follows. A source processor generates a message and routing data indicating a selected path for transmission to a destination processor. This message is applied to a switch node in the first column of the network. If the selected path is open this node transfers the data to the next node in the path as indicated by the header data, this node, in turn, transfers the data to the next node in the path and so on until the data reaches the destination processor. Alternatively, if the path to the next node is blocked at any step along the path, the transmitting node temporarily stores as much message data as it has space for in a buffer. When a previously open path becomes blocked, data transmission is suspended until the path once again becomes open. When a previously blocked path becomes open, data transmission resumes from the point at which it was suspended.

FIG. 3 is a block diagram showing circuitry suitable for use as any of the switch nodes 210 through 306. To provide a context for its description, this circuitry is identified as the node 242. The circuitry shown in FIG. 3 includes four identical message receivers and four identical message transmitters. For the sake of brevity, only one of the message receivers, 310, and one of the message transmitters, 330, are described in detail. In addition, when it is helpful to do so, an exemplary message between the message receiver 310 and the message transmitter 330 will be used to illustrate the general principles of communication between a message receiver and a message transmitter within a switch node.

The following is a description of the interface protocol between the message transmitter of one node and the message receiver in another node, to which it provides data. This description is followed, in turn, by a general description of the circuitry in a switch node with reference to FIG. 3 and by a more detailed description of the circuitry which implements the interface protocol with reference to FIGS. 4 and 5.

Figure 4:
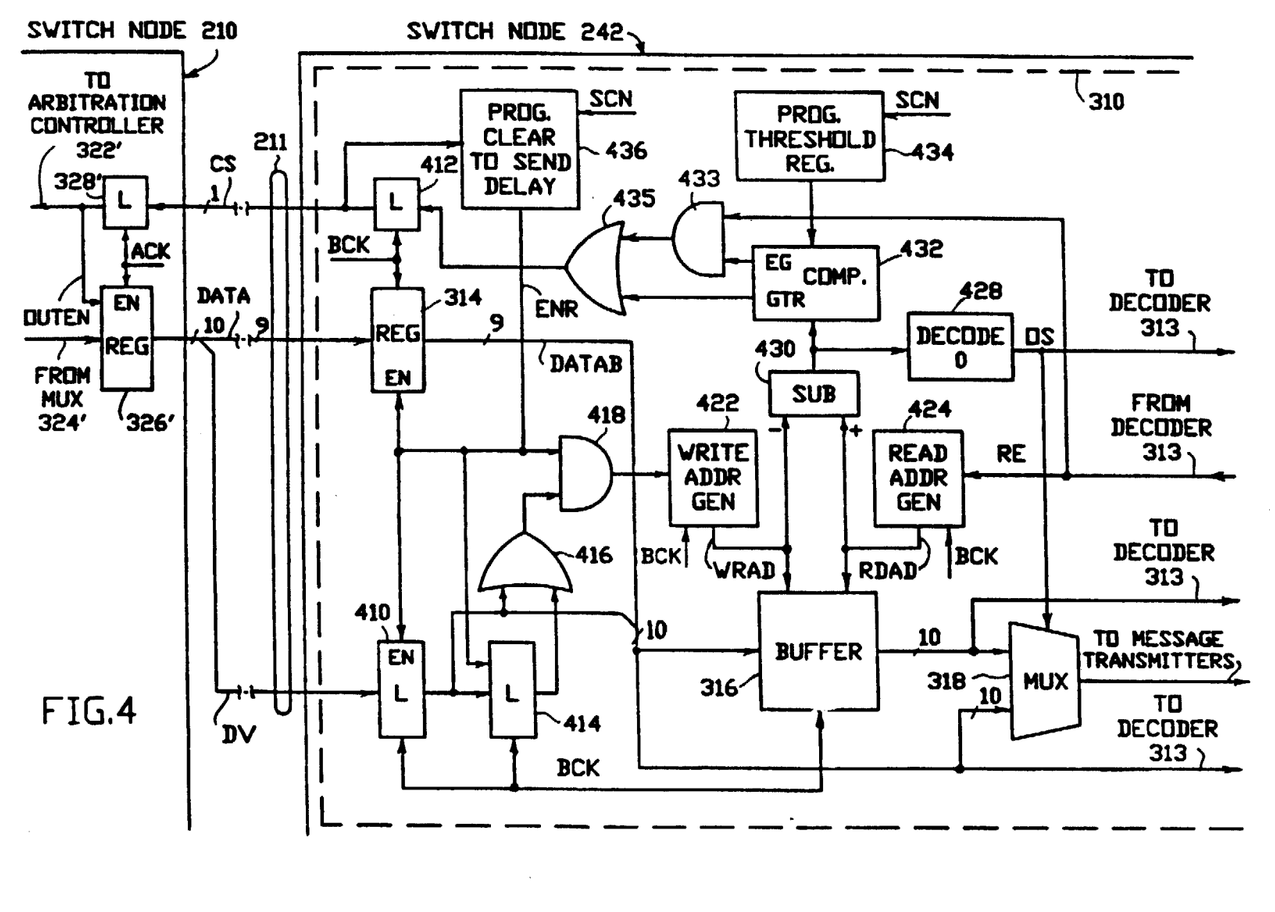
FIG. 4 is a block diagram illustrating the interface between a sending portion of one node and a receiving portion of a further node to which the one node is connected.

In FIG. 3, the message receiver 310 in the switch node 242 is coupled to a message transmitter in the switch node 210 via a transmission channel 211, as shown in FIG. 2 and in FIG. 4, described below. While the channel 211 is shown in FIG. 2 as being unidirectional, extending from the first output port of node 210 to the first input port of the node 242, the channel 211, as shown in FIGS. 3 and 4, actually conveys signals in both directions. In the described embodiment of the invention, an eight-bit message data signal and a one-bit parity signal are conveyed from the node 210 to the node 242 as a nine-bit signal DATA. A data-valid signal, DV, is also conveyed from the node 210 to the node 242. However, a clear-to-send signal, CS, is conveyed by the transmission channel 211 from the node 242 to the node 210.

The signal DATA conveys the message information to a switch node, one message portion (e.g. eight message bits and one parity bit) for each clock cycle. The data-valid signal, DV, is generated at the source processor and is used to mark the last valid portion of a message and to hold the selected path through the switch network open for an amount of time sufficient to allow an entire message to traverse the path. In this embodiment of the invention, the signal DV is active in each clock period, except the last, during which a portion of a message is being transmitted. During the transmission of the last portion of a message, the signal DV is inactive. This format for the signal DV is advantageous since it allows messages to be pipelined end-to-end without needing any intervening data to indicate when one message ends and the next message begins. The signal DV is propagated through the network with its message as set forth below in reference to FIGS. 3 and 4.

The clear-to-send signal, CS, is generated at each message receiver section of each node in the network and it is latched in the message transmitter section of the node which is coupled to provide data to the message receiver. This signal is used by a message receiver to temporarily suspend the transmission of message data when, for example, the selected path for the message is blocked. When the latched signal CS becomes active, the message transmitter is enabled to begin the transmission of a new message or, if a message had been in progress prior to the signal CS going inactive, the transmitter is enabled to immediately resume sending that message. When, on the other hand, the signal CS becomes inactive, the message transmitter repeats the current portion of the message it is sending and instructs its internal message source (i.e. the buffer of the message receiver which supplies data to the transmitter) to hold the remaining message portions. Moreover, when the latched signal CS goes inactive while a message is in progress, the message transmitter holds the current state of the signals DATA and DV and repeats them during the following clock cycles. These values of the signals DATA and DV are held until the latched signal CS again becomes active, allowing the remaining message data to be transferred to the message receiver.

Referring to FIG. 3, a register 314 in the message receiver 310 stores each portion of a message as it is provided by the message transmitter of the node 210. The data-valid signal, DV, provided by the node 210 is concatenated onto the nine-bit message portions provided by the register 314 and the resulting ten-bit values are applied to a buffer memory 316, to one input port of a multiplexor 318, and to path decoding circuitry 313. The buffer memory 316 is conditioned by a buffer controller 312 to store the ten-bit values applied to its input port on a first-in-first-out basis and to provide the stored values to a second input port of the multiplexor 318. In the present embodiment of the invention, the buffer memory 316 includes a sufficient number of storage cells to hold 32 message portions. The multiplexor 318 is conditioned by a signal MXC provided by the buffer control circuitry 312 to pass either the ten-bit values provided by the register 314 or those provided by the buffer 316. Unbuffered message data provided by the register 314 is passed by the multiplexor 318 only when the path to the next node is open and the buffer memory 316 is empty.

The path decoding circuitry 313 is responsive to the message header, provided by either the register 314 or the buffer 316, to request a path connection, for the output signals provided by the multiplexor 318, through one of the four message transmitters of the switch node 242. The output port of the multiplexor 318 and the output ports of the corresponding multiplexors 338, 358 and 378 of the other three message receivers are coupled to respectively different input ports of a multiplexor 324 in the message transmitter 330 and to corresponding input ports of multiplexors 344, 364 and 384 of the other three message transmitters of the switch node 242.

The path decoding circuitry 313 provides four output signals, transmitted via the busses DA0, DA1, DA2 and DA3, one signal for each message transmitter in the switch node. Each of the other three message receivers also include path decoding circuits (333, 353 and 373) which each provide four output signals, one for each message transmitter. A path decoding circuit makes a request to one and only one message transmitter at a time. The request is held by the path decoding circuit until it is accepted by the message transmitter.

In the exemplary message transmitter 330, four path request signals, received via the busses DA0, DB0, DC0 and DD0, from the respective path decoding circuits 313, 333, 353 and 373, are applied to respectively different input ports of a priority decoder circuit 322. The priority decoder 322 includes circuitry which selects one of the active requests applied to its input ports and, based on this selection, conditions the multiplexor 324 to gate the ten-bit values provided by the corresponding multiplexor 318, 338, 358 or 378 to the register 326. A number of priority schemes may be used by the decoder 322 to select from among the four request signals. In the present embodiment of the invention, the priority of each requester is rotated to ensure that any waiting request will eventually be selected.

The register 326 to which data is passed by the multiplexor 324 is enabled or disabled by a clear-to-send signal CS' provided by the switch node 258 via the channel A0 to the latch 328. Message portions provided by the register 326 are applied to a message receiver of the switch node 258 as the signal DATA' via the channel A0. The data-valid signal, corresponding to the message portions of the signal DATA', is split from the ten-bit values provided by the register 326 and applied to the node 258 as the signal DV'.

In addition to choosing from among the path request signals provided by the path decoders of the four message receivers, the priority decoder 322 conditions a demultiplexor 321 to pass the latched clear-to-send signal, CS', to the path decoding circuitry of the message receiver circuit that was selected to provide data to the message transmitter 330. This signal indicates to the path decoding circuitry that its path request has been accepted. The demultiplexor 321 is conditioned to select one of the busses DA0, DB0, DC0, or DD0, to convey the latched signal CS' back to the respective decoder 313, 333, 353 or 373. In the present example, the selected bus is DA0 and the latched clear-to-send signal CS' is sent to the path decoding circuit 313.

In the decoding circuit 313, the latched clear-to-send signal CS' is passed as a read-enable signal, RE, to the buffer control circuitry 312. This signal is used, as described below in reference to FIG. 4, to condition the buffer 316 to send message data to the multiplexor 318, when the signal CS' is active, or to suspend the sending of the message data when the signal CS' is inactive.

FIG. 4 is a block diagram showing details of circuitry used in a portion of a message transmitter of the node 210 and in a portion of the message receiver 310 of the node 242. Identical circuitry is used in the message transmitters and message receivers of the switch nodes of the networks 100 and 110 and in the network interface circuits I0A through I63A and I0B through I63B, shown in FIG. 1. The circuitry shown in FIG. 4 includes the input register 314, the buffer 316 and the multiplexor 318 described above in reference to FIG. 3. All other elements shown in FIG. 4 are components of the buffer control circuitry 312. This circuitry illustrates the implementation of the node interface protocol set forth above.

In FIG. 4, an output register 326' of a message transmitter of the switch node 210 provides a ten-bit output signal which includes the nine-bit signal DATA and the one-bit signal DV described above. These signals are conveyed to the switch node 242 via the transmission channel 211 and are then separated, as shown, and applied to the input register 314 and to a latch 410, respectively, in the message receiver 310.

The register 314 and latch 410 are responsive to an enable signal, ENR, generated by a programmable clear-to-send delay element 436, described below. When the signal ENR is active, the data-valid signal provided by the latch 410 is concatenated to the message portions provided by the register 314 to generate the ten-bit values which are applied to the buffer 316 and multiplexor 318 as set forth above. The data-valid signal provided by the latch 410 is also applied to a latch 414. The latch 414 is responsive to the signal ENR to selectively load the data-valid signal applied to its input port. This data-valid signal is delayed, however, by one period of the clock BCK with respect to the data-valid signal provided by the latch 410. The output signals of the latches 410 and 414 are applied to respective input terminals of an OR gate 416. The output signal produced by the OR gate is active for every message portion applied to the buffer 316 by the register 314.

The output signal of the OR gate 416 is combined with the signal ENR to generate an enable signal, WREN, for a write address generator 422. When the signal WREN is active, the write address generator 422 increments a write address value WRAD by one for each period of the clock signal BCK. The address values WRAD are applied to the buffer 316, conditioning the buffer to store the ten-bit data values applied to its input port.

Data values are read from the buffer 316 in response to read address values, RDAD applied to a read address input port of the buffer 316. The read address values RDAD are incremented by one for each period of the clock signal BCK when the read enable signal RE, provided by the path decoding circuitry 313, is active.

The read address values, RDAD, are always less than or equal to the write address values, WRAD. The difference between WRAD and RDAD equals the number of available storage cells in the buffer memory 316. This difference value is used to implement the protocol described above and to route message data around the buffer 316 when the buffer is empty and the desired path for the message is open.

The difference between the address values WRAD and RDAD is generated by a modulo 32 subtracter 430 which is coupled to receive the signals WRAD and RDAD from the respective write address generator 422 and read address generator 424. The subtracter 430 subtracts the value of the signal WRAD from that of RDAD and applies the result to one input port of a comparator 432. The other input port of the comparator 432 is coupled to receive a threshold value provided by a programmable threshold register 434. An output signal of the comparator which is active when the value provided by the subtracter is greater than the threshold value is applied to one input terminal of an OR gate 433. Another input terminal of the OR gate 433 is coupled to receive the logical AND of the read enable signal, RE, and a further output signal of the comparator which is active when the value provided by the subtractor 430 equals the threshold value. This signal is provided by an AND gate 435. The output signal of the OR gate 433 is coupled to a latch 412 which provides it to the node 210 via the transmission channel 211, as the signal CS.

The programmable threshold register 434 is provided in the message receiver to determine when the buffer 316 is almost full so that the clear-to-send signal, CS, can be made inactive in advance of the buffer becoming full. This mechanism ensures that there will be space available in the buffer 316 for a predictable number of additional message portions should they be needed. To implement this mechanism, the programmable threshold register 434 is programmed, when the network is first configured, to have a value representing a predetermined number of message portions. This value is at least equal to the maximum number of message portions that can be expected to arrive at the message receiver due to the delay in the message transmitter repsonding to the active signal CS. Thus, the programmed value includes a number of clock periods defining a time which encompasses the round-trip signal propagation delay between the nodes 210 and 242. That is to say, the delay for the signal CS to reach the data transmitter and the delay for the transmitted data to reach the receiver. The programmable threshold register 434 may be programmed, for example, using a scan line, SCN. The scan line SCN is a signal path which links all of the flip-flops, including those that constitute the register 434, in a long shift register. This signal path is a well known device used for testing purposes and for setting the state of a finite state machine to an initial value. When the read enable signal, RE, becomes active, data is transferred from the buffer 316 to the message transmitters of the node 242. When the amount of available space in the buffer equals, and then rises above the threshold value, the signal provided by the OR gate 433 again becomes active, and an active signal CS is sent to the switch node 210.

However, due to the signal propagation delay between the nodes 210 and 242, data is not immediately available at the input to the register 314. To compensate for this delay, the message receiver includes a programmable clear-to-send delay mechanism which establishes when the data present at the input port of the register 314 is valid and should be latched. Since the message transmitter will take some number of clock periods to respond to the signal CS, the message receiver desirably includes circuitry to determine the exact clock period in which to enable or disable its own data input logic.

The delay in the response of the message transmitter to the signal CS is substantially fixed for a given network configuration and can be predetermined for each link. In the present example, the signal CS is delayed, by an amount of time substantially equal to the round-trip propagation delay between the nodes 210 and 242, and used to enable or disable the latching of input data. In the circuitry shown in FIG. 4, this delaying function is provided by a programmable delay element 436 which is programmed when the network is first configured to delay the signal CS to produce the enabling signal ENR. This delay element may be programmed using the scan line, SCN, as described above in reference to the programmable threshold register 434. The signal ENR is applied to the data input register 314, to the latches 410 and 411 and to the AND gate 418.

As set forth above, when the buffer 316 is empty and the selected path for a message is open, the circuitry used in the present embodiment of the invention, routes the message around the buffer 316, directly to the multiplexor 318. The circuitry which implements this function includes a decoder 428 which is coupled to the output port of the subtracter 430. The decoder 428 provides an output signal OS which is active only when the value provided by the subtracter is equal to zero. This condition occurs when the buffer 316 is empty. The signal OS is applied to the path decoding circuitry 313 to condition it to use the path information from the message provided by the register 314 rather than that provided by the buffer 316. The multiplexor 318 is responsive to the signal OS to direct the ten-bit signals provided by the register 314 to the message transmitters of the node 242 when the buffer 316 is empty.

When the message portions provided by the register 314 are routed around the buffer 316 to the multiplexor 318, they are also written into the buffer 316. However, the buffer remains "empty" since the read address RDAD is incrementing in lock-step with the write address WRAD and, so the output signal provided by the subtracter 430 is held at a value of zero.

Figure 5:
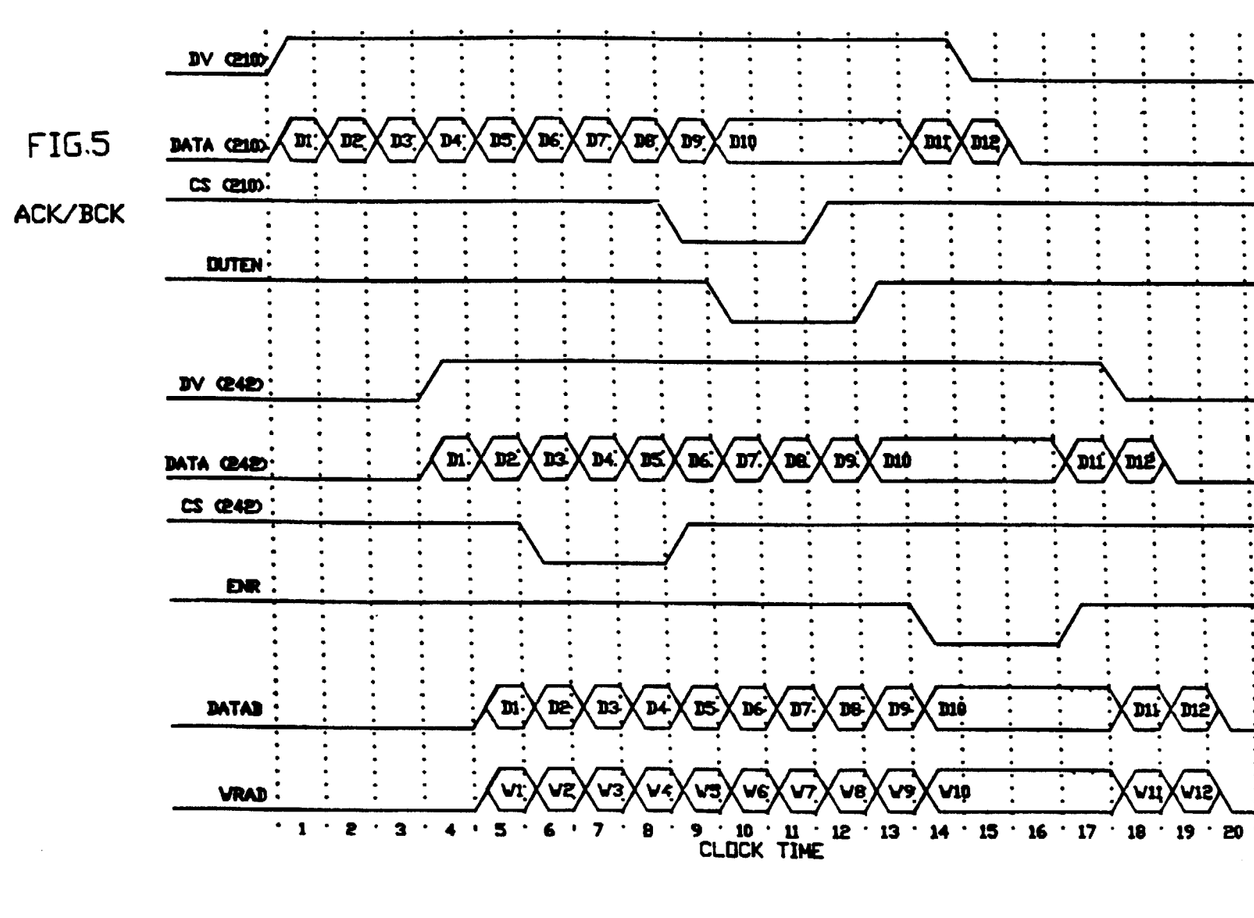
FIG. 5 is a signal timing diagram useful for explaining the operation of the interface circuitry shown in FIG. 4.

A signal timing diagram, representing the passage of a message through the interface, is provided in FIG. 5 to further illustrate the operation of the interface circuitry shown in FIG. 4. In the example shown in FIG. 5, the signal propagation delay between the nodes 210 and 242 is three clock periods and the message receiver 310 experiences a period of three clock periods when no buffer space is available. It is assumed that, at the start of the example, the buffer 316 is not empty. For the sake of the example, the clock signals, ACK and BCK used by the nodes 210 and 242 are assumed to be substantially the same.

In FIG. 5, the signal DV and a message portion D1 become active at the output port of the node 210 at the start of a time interval 1. Three clock periods later, at the start of a time interval 4, the signal DV and the message portion D1 have propagated to the input ports of the latch 410 and register 314, respectively. During a time interval 5, the message portions D1 is applied to the buffer memory 316 and the write address value, WRAD is incremented.

When WRAD is incremented in the time interval 5, the difference between WRAD and RDAD equals the threshold programmed into the register 434. Consequently, during the time interval 6, the signal CS provided by the latch 412 becomes inactive and remains inactive for three clock periods. Three clock periods after time interval 6, during the time interval 9, the signal CS has propagated to the switch node 210 and, during the time interval 10, the signal CS has been stored in the latch 328' and has disabled the output register 326' of the switch node 210. When disabled, the register 326' holds the message portion and its corresponding data valid signal, DV, at their present value.

The signal CS becomes active at the output terminal of latch 412 during the time interval 9 and is propagated to the switch node 210 during the time interval 12 and to the output register 326' during the time interval 13. Thus, the message portion, D10 held at the output port of the node 210 during time intervals 10 through 13 and is available at the input port of the node 242 during the time intervals 13 through 16.

During the time intervals 14, 15 and 16, the signal ENR is inactive. This signal is a delayed version of the signal CS provided by the programmable delay element 436. The inactive signal ENR disables the register 314 and the latch 410 and inhibits the write address generator 422 for incrementing. Consequently, data values provided in this interval are not stored in the buffer memory 316. However, during the time interval 17, the signal ENR becomes active and the held message portion, D10, is stored in the buffer 316.

During the time interval 18, the signal DV applied to the latch 410 becomes inactive, indicating that the message portion, D12, provided during the time interval 18 is the last data portion of the message. By the action of the latches 410 and 414 and the gates 416 and 418, this message portion is stored into the buffer memory 316. Thus, at the end of the time interval 18, the buffer 316 holds the entire message. The message portions are arranged in consecutive memory locations with no indication that the message transmission to the node was interrupted.

The invention described above provides performance advantages over other network protocols since it allows transmission rates from a particular source processor to be substantially independent of the propagation delay between the source and destination processors. Since an individual message is held in its path until transmission is completed, the message length is substantially independent of the size of the buffers used in the network. Moreover, because a message may advance through the network until a blocked node is encountered, the time delay required to establish a path for a message is reduced from the time needed to reserve the entire path to the time needed to advance the message from a previously blocked node to its destination processor. In addition, this protocol imposes minimal routing overhead on the network since each message is automatically routed through the network, one node at a time.

Those skilled in the art will recognize that, while the invention has been described in terms of a preferred embodiment, it may be practiced as outlined above with modifications within the spirit and scope of the appended claims.

The invention claimed is:

1. A method of transferring data between a message transmitter in a first node of a data communications network and a message receiver in a second node of the network, comprising the steps of:
   A. establishing first and second dedicated paths in said network between said first node and said second node;
   B. sending message data from said message transmitter to said message receiver via said first dedicated path;
   C. storing said message data in a buffer of said message receiver;
   D. retrieving said stored message data from said buffer; and
   E. signalling said message transmitter via said second dedicated path to suspend the sending of message data when the amount of available storage locations in said buffer is less than a threshold value and to resume the sending of message data when the amount of available storage locations in said buffer is not less than the threshold value, where said threshold value is greater than zero 2. The method for transferring data set forth in claim 1, wherein:
   the step C includes the step of applying the stored message data retrieved from said buffer to a further message transmitter contained in said second node; and
   the step D includes the steps of:
   generating a value representing the number of available storage locations in said buffer;
   comparing the generated value to said threshold value;
   emitting a control signal which is in a first state when said generated value is less than said threshold value and which is in a second state otherwise.

3. The method of transferring data set forth in claim 2 wherein said threshold value is not less than a value representing a maximum amount of message data which may be transferred from the message transmitter to the message receiver in an amount of time substantially equal to twice the time required for a signal to be transmitted between the message transmitter and message receiver.

4. The method of transferring data set forth in claim 3, further comprising the steps of:
   delaying said control signal by the amount of time substantially equal to twice the time required for a signal to be transmitted between the message transmitter and the message receiver;
   disabling said buffer, responsive to said delayed control signal, from storing said message data.

5. The method of transferring data set forth is claim 3 further comprising the steps of:
   sending, from said message transmitter to said message receiver, a message marker signal indicating when a predetermined message data portion is provided by said message transmitter;
   storing said message marker signal in parallel with said predetermined message data portion in said buffer; and
   retrieving said stored message marker signal in parallel with said predetermined message data portion from said buffer, wherein said stored message marker signal indicates when said predetermined message data portion is provided by said buffer.

6. The method of transferring data set forth in claim 5 wherein said predetermined message data portion is the last message portion of a message.

7. A data communications network comprising:
- a matrix of interconnecting nodes for transferring data among plural processors connected to said matrix in a network, said network including means for establishing a path between any two of said processors wherein said path includes dedicated first and second paths between first and second ones of said interconnecting nodes;
- message transmission means, coupled to at least one of said first and second interconnecting nodes for providing a sequence of message data portions along said first path and responsive to a control signal along said second path to selectively suspend and resume the providing of said sequence of message data portions;
- signal transmission means, coupled to said message transmission means of said first switch node, for conveying said sequence of message data portions;
- signal receiving means, coupled to said signal transmission means for receiving said sequence of message data portions, including:
- buffer means for storing said sequence of message data portions in respective data locations;
- control means, coupled to said buffer means for generating said control signal to condition said message transmission means to suspend the providing of said sequence of message data portions when the number of available data locations in said buffer means is less than a predetermined value and to resume the providing of said sequence of message data portions when the number of available data locations stored in said buffer means is not less than said predetermined value, said predetermined value being greater than zero.

8. The data communications network set forth in claim 7, wherein:
- said message transmission means provides said message data portions at a predetermined rate;
- said control means of said message receiving means is coupled to provide said control signal to said message transmission means via said data transmission means;
- said data transmission means conveys said message data portions and said control signal subject to a predetermined signal propagation delay; and
- said predetermined value used by said control means is not less than a maximum number of message data portions which may be provided at said predetermined rate during an amount of time substantially equal to twice said predetermined signal propagation delay.

9. The data communications network set forth in claim 8, further comprising:
- means, coupled to said control means for delaying said control signal by an amount of time substantially equal to twice said predetermined signal propagation delay; and
- means, coupled to said buffer means and responsive to said delayed control signal for selectively disabling said buffer means from accepting message data portions.

10. The data communications network set forth in claim 9, wherein said predetermined value and the amount of time delay provided by said delay means are progammable to accommodate various predetermined signal propogation delay times.

11. The data communications network set forth in claim 8, further comprising:
- means, coupled to said message transmission means, for providing a marker signal, via said data transmission means and in parallel with said message data portions, wherein, said marker signal indicates when a predetermined one of said message data portions is transmitted; and
- means, coupled to said data receiving means for storing said marker signal in said buffer means in parallel with said message data portions.

* * * * *